United States Patent [19]
Laverty

[11] Patent Number: 5,291,855
[45] Date of Patent: Mar. 8, 1994

[54] BIRD FEEDER

[76] Inventor: Ralph E. Laverty, 2606 Detroit Rd., Niles, Mich. 49120

[21] Appl. No.: 944,410

[22] Filed: Sep. 14, 1992

[51] Int. Cl.⁵ .............................................. A01K 39/00
[52] U.S. Cl. ...................... 119/52.3; 119/53; 119/57.9
[58] Field of Search .............. 119/52.2, 52.3, 53, 119/57.8, 57.9

[56] References Cited

U.S. PATENT DOCUMENTS

| | | | |
|---|---|---|---|
| D. 174,139 | 3/1955 | Sadler | 119/52.3 |
| 1,649,250 | 11/1927 | Patterson | 119/53 |
| 2,496,828 | 2/1950 | Throckmorton | 119/53 |
| 2,522,634 | 9/1950 | Pittenger | 119/53 |
| 2,931,336 | 5/1960 | Lather | 119/52.3 |
| 2,961,995 | 11/1960 | Martin | 119/53 |
| 3,090,354 | 5/1963 | Merritt et al. | 119/52.3 |
| 3,780,703 | 12/1973 | Boehland | 119/53 |
| 4,389,975 | 6/1983 | Fisher | 119/52.3 |
| 4,765,277 | 8/1988 | Bailey et al. | 119/57.9 |
| 5,069,164 | 12/1991 | Wiwi | 119/53 |

FOREIGN PATENT DOCUMENTS 126047 11/1947 Australia .................................... 119/53

*Primary Examiner*—John G. Weiss
*Attorney, Agent, or Firm*—R. Tracy Crump

[57] ABSTRACT

A bird feeder having a feeder bowl supported by a post and having a tubular member located spacedly around the post and extending a sufficient distance below the feeder bowl to prevent a squirrel or like ground animal from reaching the feeder bowl. The side wall of the tubular member is spaced a sufficient distance away from the post to prevent a squirrel or like ground animal from reaching the tubular member from the post to continue climbing to reach the food.

8 Claims, 7 Drawing Sheets

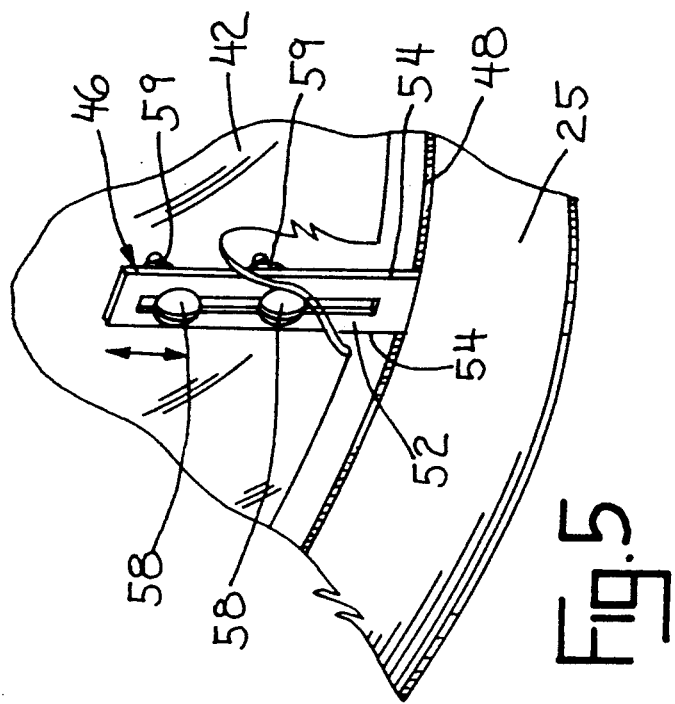
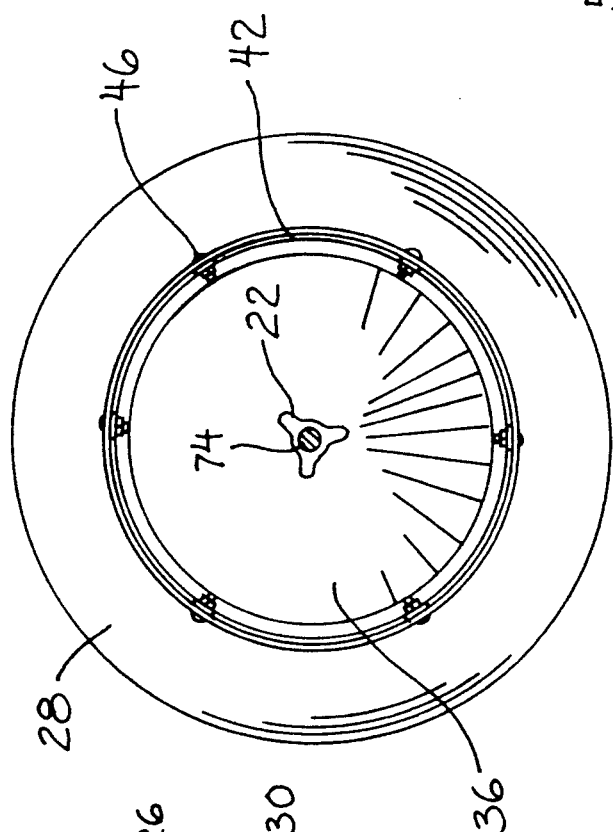
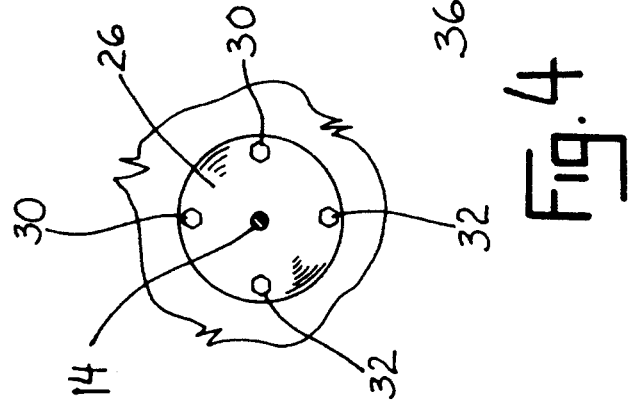

BIRD FEEDER

BACKGROUND OF THE INVENTION

This invention is related to an elevated bird house feeder.

Bird feeders are commonly used by many homeowners. The bird feeder normally includes a feeder bowl or penthouse spacedly positioned above a feeding floor supported by a post. However, squirrels can crawl up the post and cross the bottom of the floor to eat the bird food on the feeding floor.

SUMMARY OF THE INVENTION

This bird feeder solves the aforementioned squirrel problem by installing a stopper or skirt around the feeder bowl supporting post to prevent squirrels from gaining access to the bird food upon the feeding floor of the feeder. The stopper is a cylindrical tube that extends downwardly from the feeding floor and coaxially about the post. The stopper is spaced a sufficient distance away from the post so that a squirrel climing the post cannot reach around the stopper to climb upon the feeding floor where the food falls. The feeder bowl in which the bird seed is stored is supported spacedly above like feeding floor by legs and can be held in position by an overlying plate. A deflector cone is located within the feeder bowl and supported upon the feeding floor for directing the feed within the bowl onto the floor.

It is an object of this invention to provide a bird feeder that prevents squirrels and other like ground animals from eating the bird's food.

Other objects of this invention will become apparent upon a reading of the following description.

BRIEF DESCRIPTION OF THE DRAWINGS

A preferred embodiment has been chosen for purposes of illustration wherein:

FIG. 3 is a cross sectional view taken along line 3—3 of FIG. 2.

FIG. 4 is a sectional view taken along line 4—4 of FIG. 2.

FIG. 5 is a fragmentary perspective view of the leg supporting the feed bowl.

DETAILED DESCRIPTION OF THE PREFERRED EMBODIMENTS

The preferred embodiments herein described are not intended to be exhaustive or to limit the invention to the precise forms disclosed. They are chosen and described to explain the principles of the invention and its application and practical use to enable others to follow its teachings.

Figure 1:
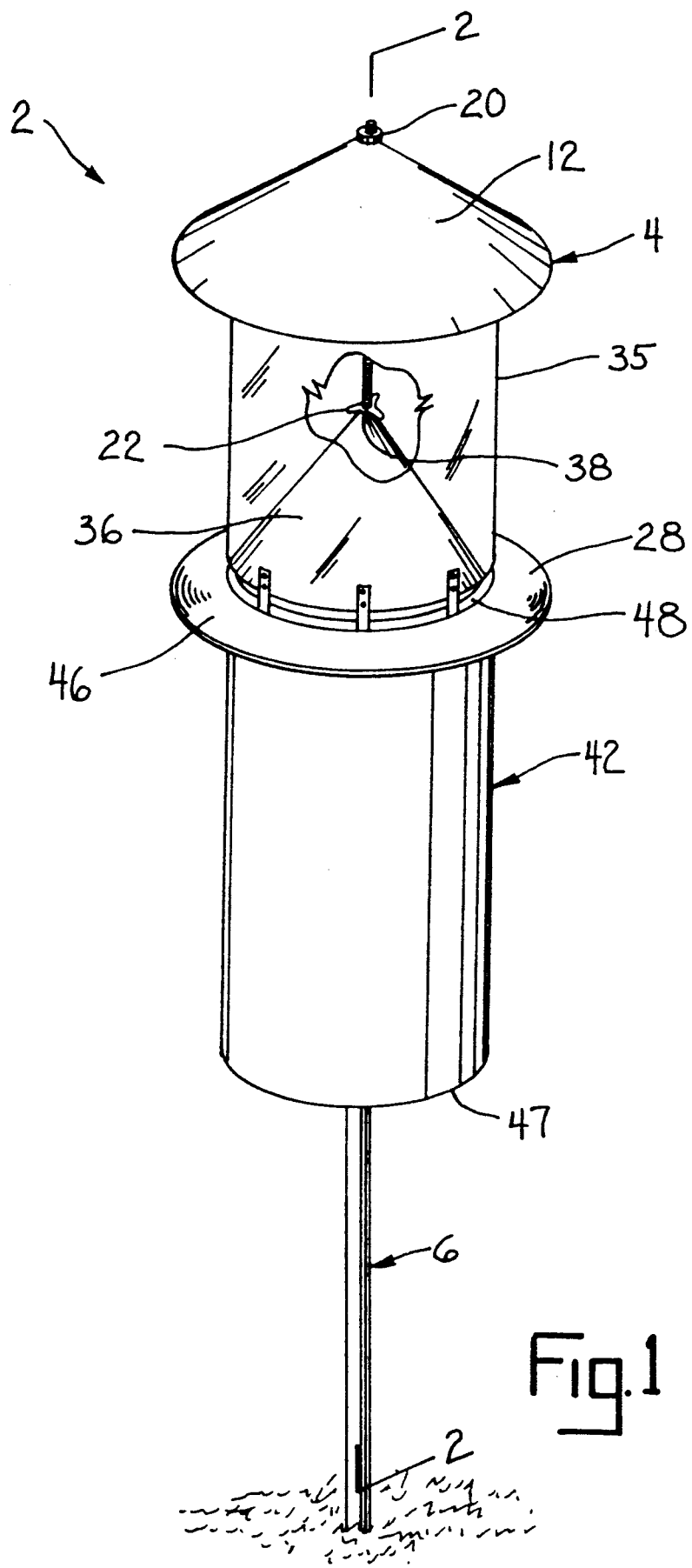
FIG. 1 is a perspective view of one embodiment of the bird feeder of this invention.
Figure 2:
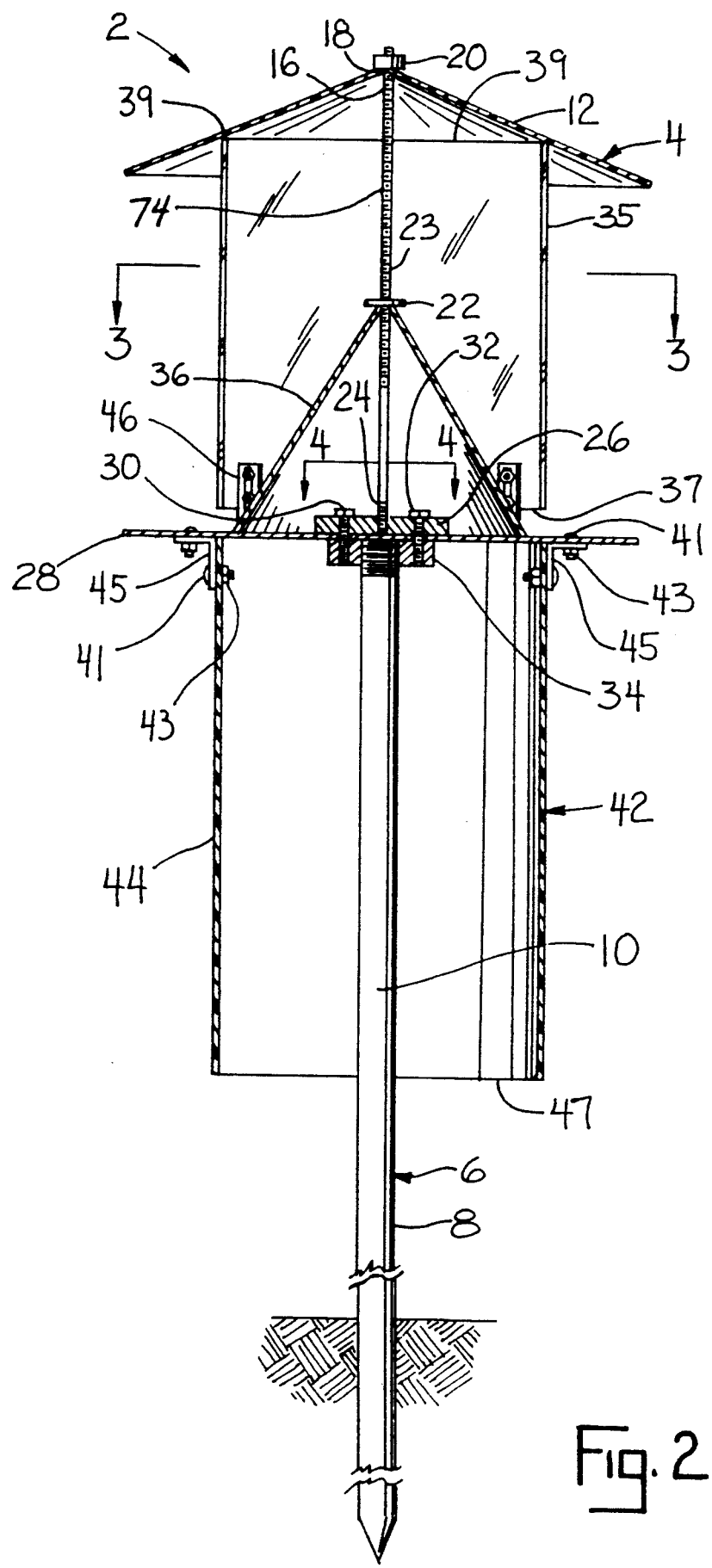
FIG. 2 is a sectional view of the feeder taken along line 2—2 of FIG. 1.

Bird feeder 2 includes a feed section 4 elevated and supported by a post 6 as depicted in FIGS. 1 and 2. Post 6 is shown in one piece but can be of multiple interconnected pieces if desired.

The threaded upper end of the post 6 is turned into a nut 34. A disk shaped floor 28 is placed and centered upon nut 34. Nut 26 is then placed upon floor 28 and centered over nut 34. Screws 30 and 32 extend through the floor 28 and secure nuts 26 and 34 to the floor. A threaded upright rod 16 is then turned and secured into nut 26. An inverted deflector cone 36 extends about rod 16 with the rod projecting through the apex 38 of the cone. Cone 36 rests at its lower end upon floor 28. A thumb nut 22 is turned upon rod 16 and brought to bear against the cone.

A feeder bowl 35 extends around cone 36. Feeder bowl 35 is supported at its lower edge 37 by six legs 46, spaced 60° apart as illustrated in FIG. 3. The legs are seated in an annular groove 48 in floor 28 that is concentric with the cone and are each secured to feed bowl 35 by a pair of screws 58 and nuts 59. Each leg 46 is slotted to allow for its vertical adjustment relative to the feeder bowl. An inverted cone-shaped roof 12 rests upon feeder bowl 35 at its upper edge 39 with rod 16 extending through the roof apex 18. Nut 20 is turned onto rod 16 into abutment with the roof to secure it upon the feeder bowl.

The bird feeder includes a tubular skirt or stopper member 42 fitted around post 6 which acts as a baffle that prevents squirrels and other similar ground animals from climbing the post and eating the bird food placed on the feeding floor 28. The floor 28 extends outwardly from stopper member 42. Stopper member 42 is secured to the bottom of the floor by L-shaped brackets 45 mounted by screws 41 and nuts 43 to the stopper and floor. Stopper member 42 is cylindrical and open at its lower end 47. It is concentric with post 6 and has its side wall 44 spaced a sufficient distance from feeding floor 28 to prevent a squirrel or similar ground animal from climbing the post, reaching around the stopper member, and gaining access to the feeding floor 28.

Figure 6:
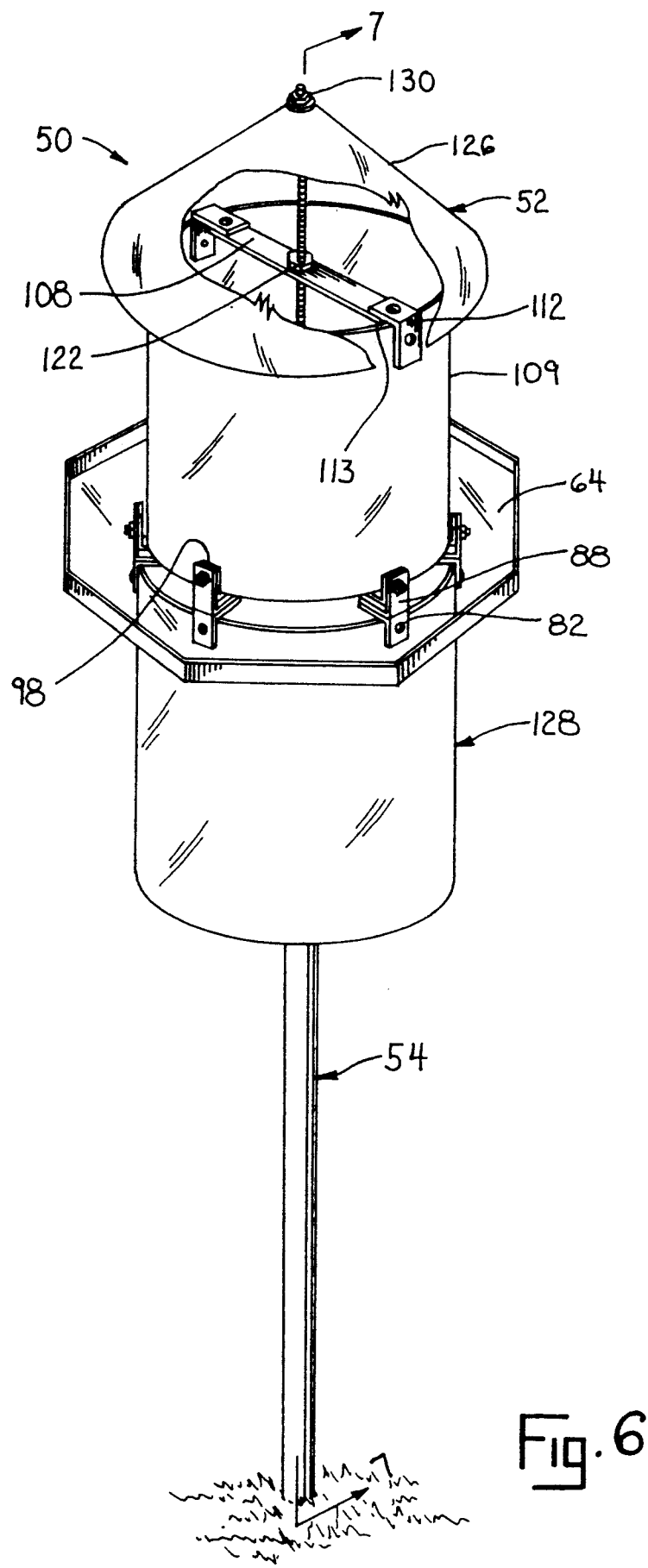
FIG. 6 is a perspective view of a second embodiment of the bird feeder of this invention.
Figure 7:
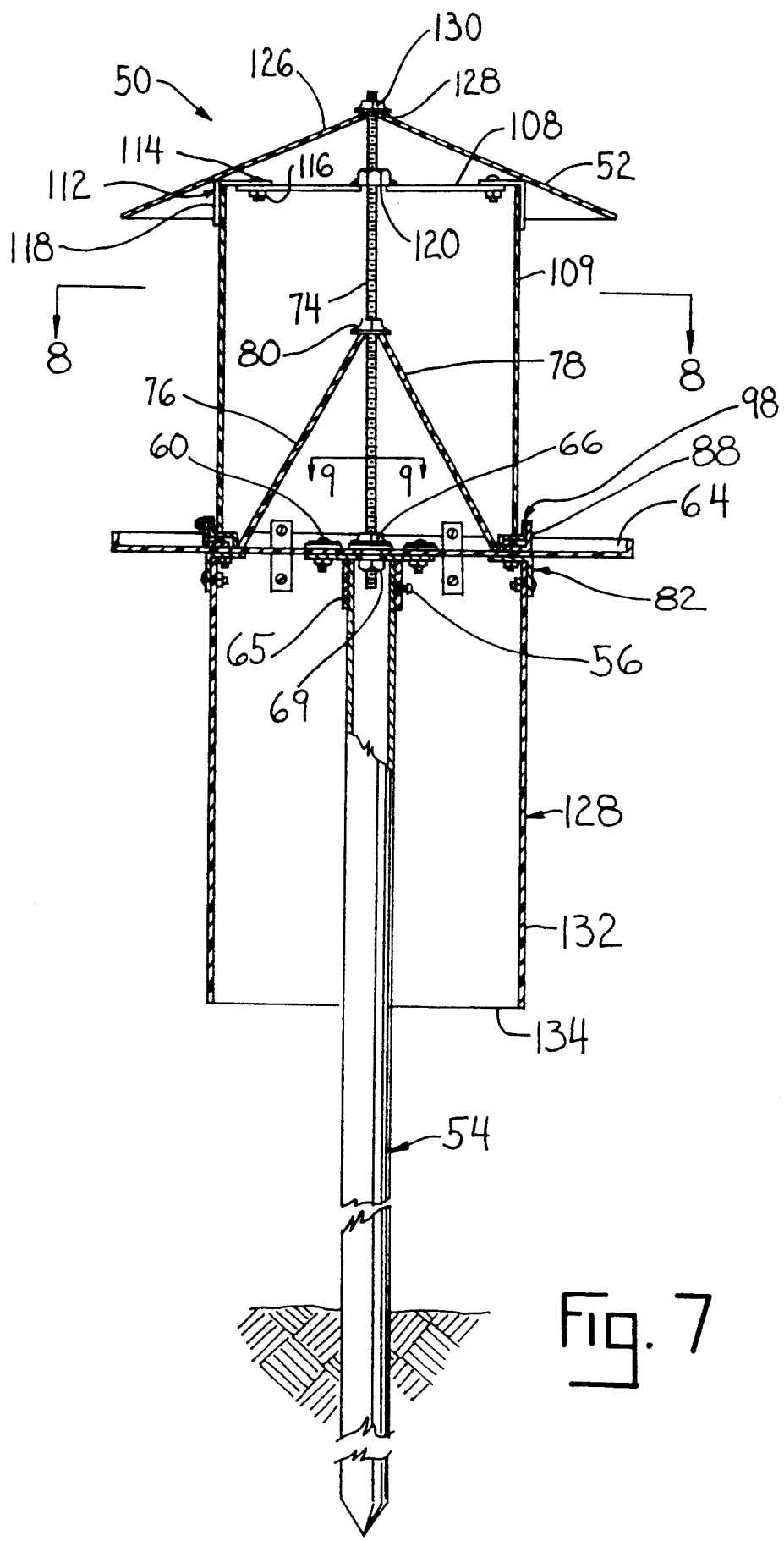
FIG. 7 is a sectional view of the feeder taken along line 7—7 of FIG. 6.
Figure 9:
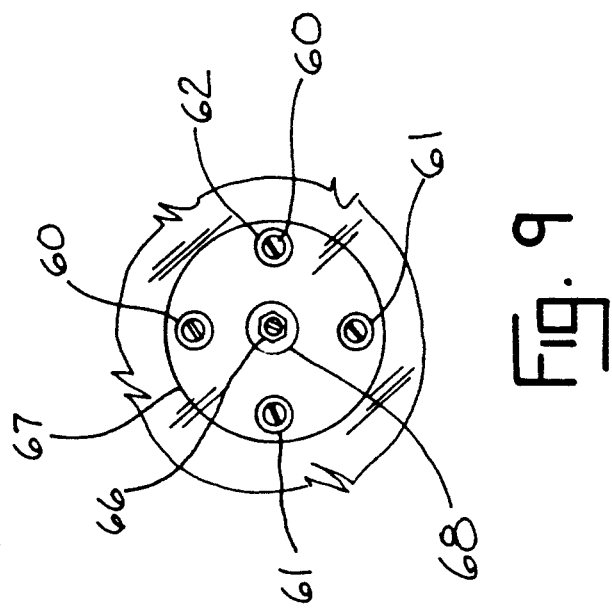
FIG. 9 is a sectional view taken along line 9—9 of FIG. 7.
Figure 8:
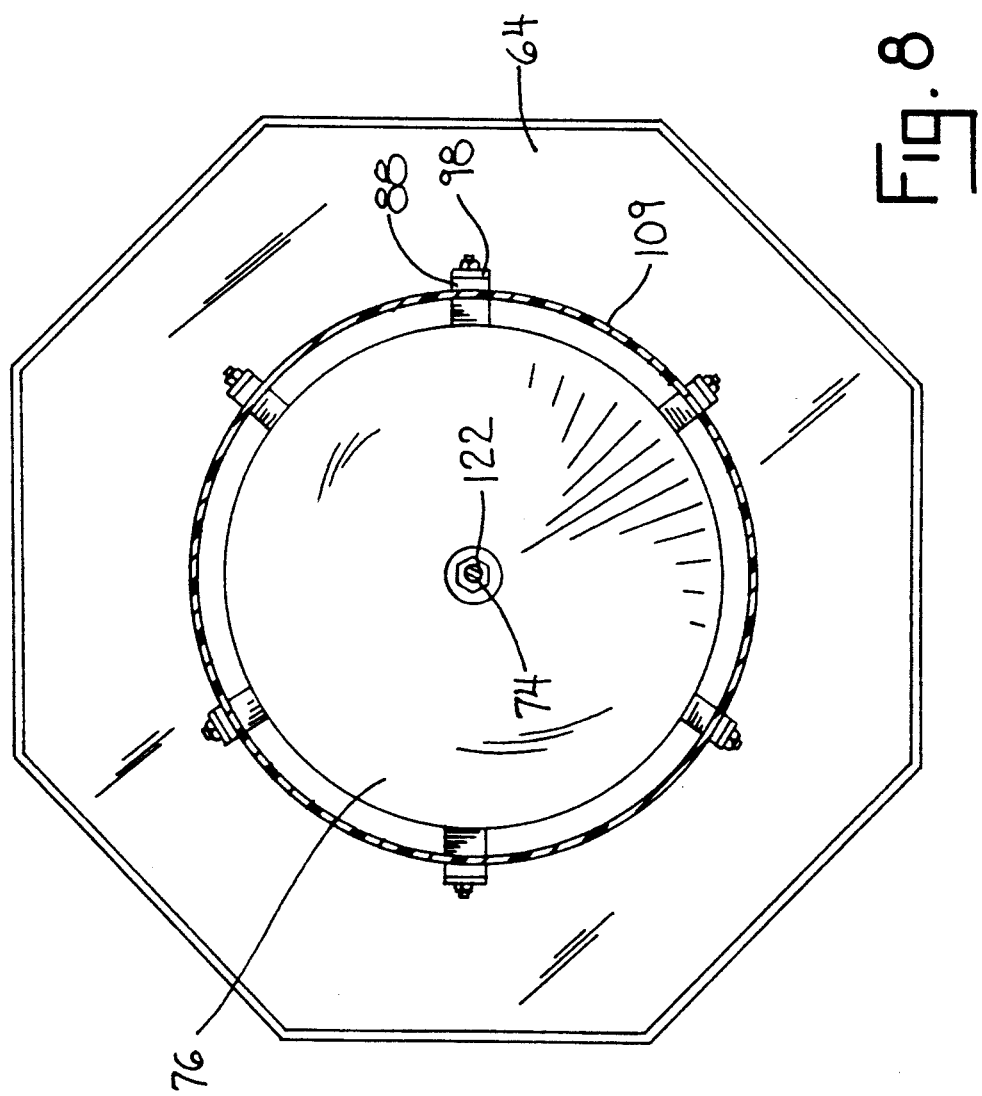
FIG. 8 is a cross-sectional view taken along lines 8—8 of FIG. 7.
Figure 10:
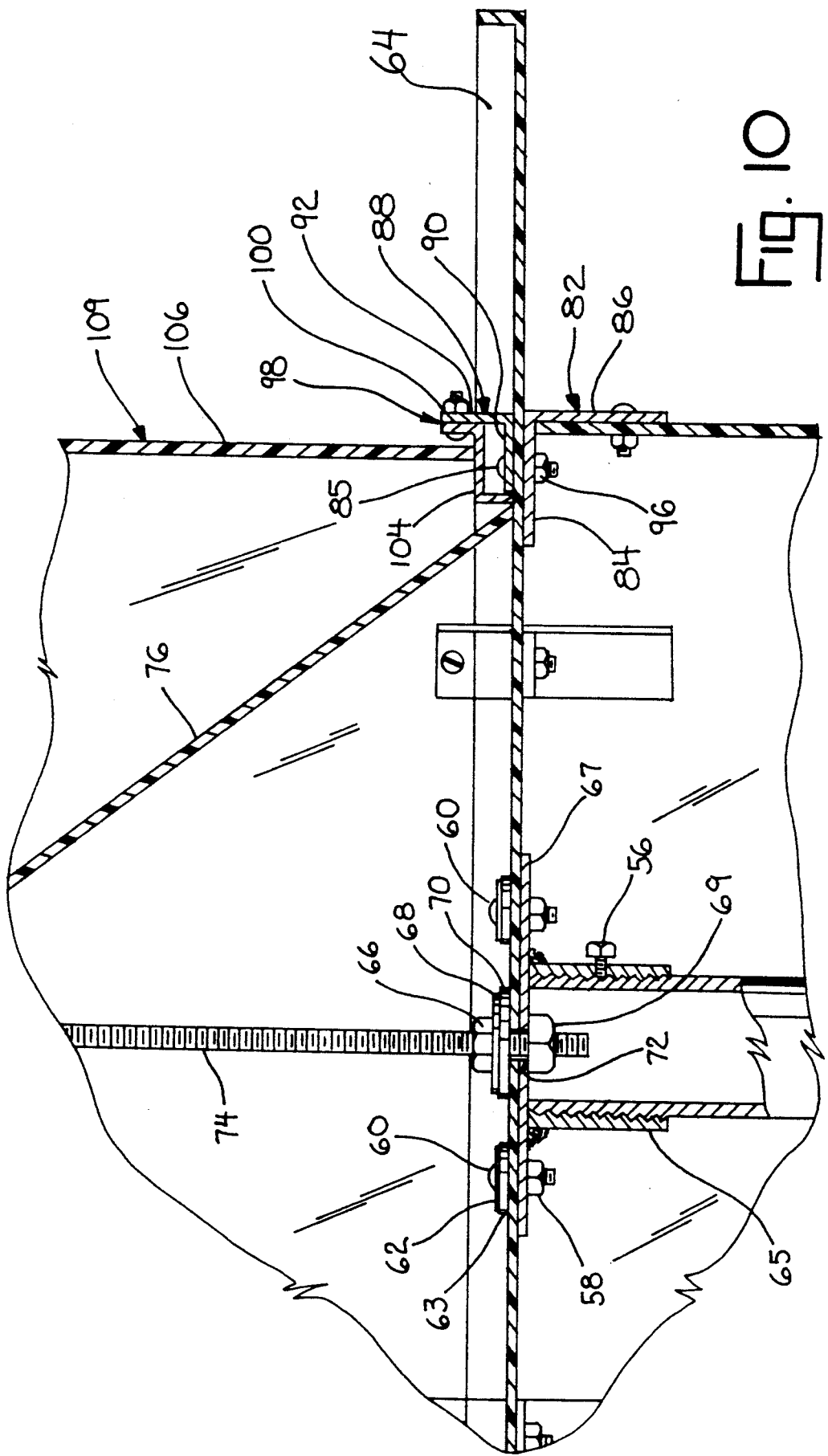
FIG. 10 is a fragmentary side view of the bird feeder showing the attachment of the floor to the stopper and post.

In another embodiment shown in FIGS. 6–10, the bird feeder 50 also includes a feed section 52 elevated and supported by post 54. Post 54 is shown in one piece by can be of multiple interconnected pieces if desired. As seen in FIG. 7 and FIG. 10, the post is threaded into a coupling 65. A set screw 56 is used to help secure the post to the coupling. An octagonally shaped floor 64 is placed and centered upon the coupling 65. Floor 64 and coupling 65 at its end plate 67 are secured together by screws 60 with metal washers 62, rubber washers 63 and nuts 58.

A threaded upright rod 74 extends at its lower end through an opening 72 in floor 64 and coupling end plate 67. Opposing nuts 66 and 69, metal washer 68 and rubber washer 70 secure rod 74 to floor 64 and coupling end plate 67. An inverted deflector cone 76 extends about rod 74 with the rod projecting through the apex 78 of the cone. Cone 76 rests at its lower end upon floor 64. A flanged nut 80 is turned upon rod 74 and brought to bear against the cone.

Six equal angularly spaced L-shaped brackets 82 are equal radially positioned about rod 74 underneath floor 64 with the foot 84 of each bracket abutting the bottom of the floor 64 and the upright leg 86 of each bracket extending downwardly as illustrated in FIG. 10. Another six equal angularly L-shaped brackets 88 are positioned on top of the floor 64. Each bracket 88 is located directly over an L-shaped bracket 82 with the foot 90 of each bracket 88 abutting the top of the floor and the upright leg 92 of each such bracket extending upwardly in vertical alignment with the leg 86 of the lower bracket 88 as seen in detail in FIG. 10. A screw 85 is inserted through each pair of aligned feet 84 and 90 and floor 64 and is secured by a nut 96 to clamp brackets 82 and 88 to the floor. A support member 98 having upright leg 100 and foot 104 is securely mounted to leg 92 of each L-shaped bracket 88 with foot 104 spacedly positioned from foot 90 of the bracket 88 and floor 64. A cylindrical feeder bowl 100 extends around deflector cone 76 with the side wall 106 of the bowl lying adjacent legs 102 of support member 98, and its lower edge 111 resting upon feet 104 of the support member and thus is spaced from floor 64.

As illustrated in FIGS. 6 and 7, threaded rod 74 extends through a flat bar or strap member 108 at a centered edge slot 110. L-brackets 112 are mounted and secured to the ends of bar member 108 by screws 114 and nuts 116 such that vertical legs 118 of the L-brackets extend downwardly along the exterior of the side wall 106 of the feeder bowl 109, holding it in place. A nut 122 is turned upon rod 74 and against bar member 108 to urge the bar member into compressive contact with feeder bowl 109. An inverted cone-shaped roof 126 rests upon L-brackets 112 and feeder bowl 109 at its upper edge 113 with rod 74 extending through the roof apex 128. Nut 130 is turned onto rod 76 into abutment with the roof 126 to secure it upon the feeder bowl.

A stopper member 128 having a side wall 132 and a lower open end 134 extends about post 54 and is connected to the legs 86 of L-brackets 82. Stopper member 128 is similar in design and functions as the stopper member 42 of the previous described embodiment of FIGS. 1-5.

In use, the nut 20, 130 on top of the roof is removed. The roof 12, 126 is removed and the food is then poured into the feeder bowl 35, 109 with the deflector cone 36, 76 directing the food to move through the opening between the lower edge of the feeder bowl 42, 109 and the floor 28, 64. The floors, deflector cones, feeder bowls, taps, and stopper members of the described embodiment of this invention may be formed of a light weight plastic.

It is understood that the above description does not limit the invention to the above details, but may be modified within the scopes of the following claims.

I claim:
1. A bird feeder comprising:
a container for bird food, a post adapted for anchoring in the ground and supporting said container in an elevated position, said container including floor means for exposing said food for feeding, a tubular member located adjacently below said floor means and extending generally concentrically about said post, said tubular member having a lower open end defined by side wall spaced a sufficient distance from said post to prevent a ground animal in climbing the post when anchored in the ground from climbing around said tubular member lower edge, said tubular member having an upper closed end, said floor means extending peripherally beyond said tubular member upper closed end.

2. The bird feeder of claim 1 wherein said tubular member upper closed end extends to said floor means.

3. The bird feeder of claim 2 wherein said floor means includes a floor part, said tubular member extending to said floor part.

4. The bird feeder of claim 3 wherein said container includes a feed bowl having a lower edge seated spaced above said floor part, a plurality of legs extending between said bowl and floor part spacing said bowl lower edge from the floor part.

5. The bird feeder of claim 4 wherein said floor mans includes deflecting means within said bowl for directing feed within the bowl onto said floor part under said bowl lower edge.

6. The bird feeder of claim 5 wherein said floor part has an annular groove therein about said bowl, said legs seated within said groove.

7. The bird feeder of claim 6 and means adjustably connecting each leg to said bowl for selectively varying the spacing of said bowl from said floor part.

8. A bird feeder comprising:
a floor means for carrying bird food, a post adapted for anchoring in the ground and supporting said floor means in an elevated position, a tubular member located adjacently below aid floor means and extending generally concentrically about said post, said tubular member having a lower open end defined by side wall spaced a sufficient distance from said post to prevent a ground animal in climbing the post when anchored in the ground from climbing around said tubular member lower edge, said tubular member having an upper closed end, said floor means extending peripherally beyond said tubular member upper closed end.

* * * * *